Sept. 12, 1933.  C. W. COYAN  1,926,140
NONSKID DRIVING APPARATUS FOR AUTOMOBILES AND THE LIKE
Original Filed July 10, 1931   4 Sheets-Sheet 1

Inventor
C. W. Coyan

By Clarence A. O'Brien
Attorney

Sept. 12, 1933.                C. W. COYAN                1,926,140
          NONSKID DRIVING APPARATUS FOR AUTOMOBILES AND THE LIKE
                Original Filed July 10, 1931    4 Sheets-Sheet 2

Inventor

C. W. Coyan

By *Clarence A. O'Brien*
                                                    Attorney Sept. 12, 1933.  C. W. COYAN  1,926,140
NONSKID DRIVING APPARATUS FOR AUTOMOBILES AND THE LIKE
Original Filed July 10, 1931  4 Sheets-Sheet 3
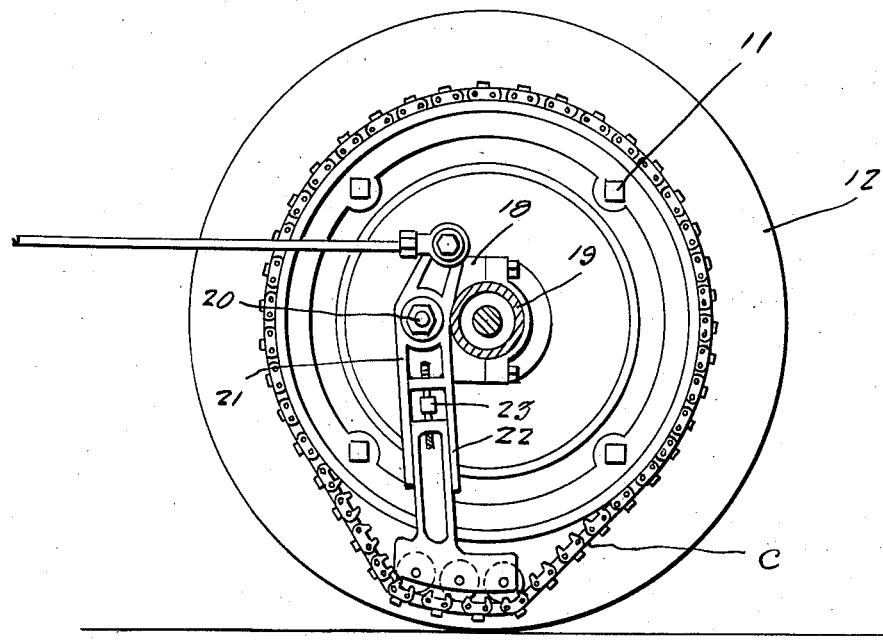
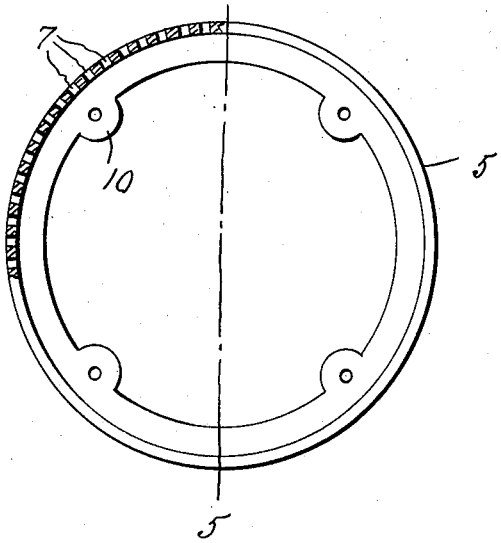 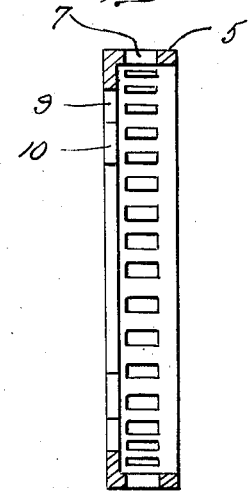
Inventor
C. W. Coyan
By Clarence A. O'Brien
Attorney Sept. 12, 1933.  C. W. COYAN  1,926,140
NONSKID DRIVING APPARATUS FOR AUTOMOBILES AND THE LIKE
Original Filed July 10, 1931  4 Sheets-Sheet 4

Inventor
C. W. Coyan
By Clarence A. O'Brien
Attorney

Patented Sept. 12, 1933

1,926,140

UNITED STATES PATENT OFFICE 1,926,140

NONSKID DRIVING APPARATUS FOR AUTOMOBILES AND THE LIKE

Charles W. Coyan, Homestead, Pa.

Application July 10, 1931, Serial No. 549,991
Renewed March 6, 1933

3 Claims. (Cl. 180—15)

The present invention relates to a non-skid driving apparatus for use on automobiles, trucks and the like and has for its prime object to provide means which may be brought into action quickly to prevent skidding of the automobile or slipping of the wheels on ice, and under like conditions.

A still further very important object of the invention resides in the provision of an apparatus of this nature which is exceedingly simple in its construction, strong and durable, convenient, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 3 is a sectional view through the rear axle showing a rear wheel in elevation with the apparatus associated therewith.

Figure 4 is a sectional elevational view of one of the rear sprockets.

Figure 5 is a sectional view taken substantially on the line 5—5 of Figure 4.

Figure 1:
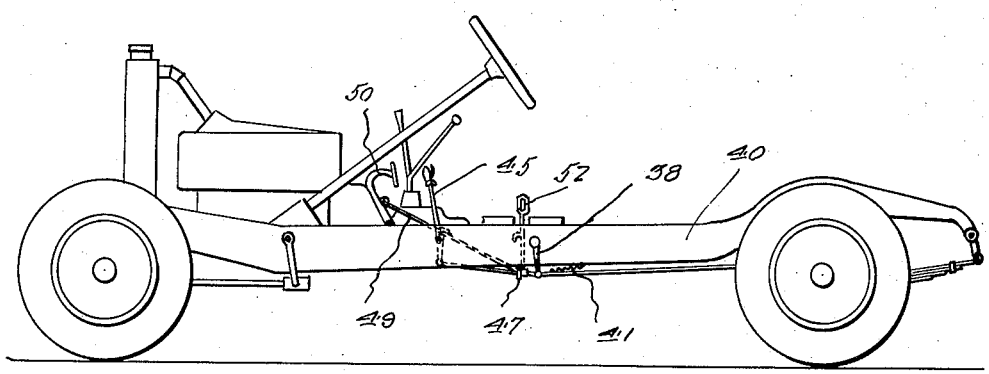
Figure 1 is a fragmentary side elevation of an automobile showing an application of my apparatus.
Figure 10:
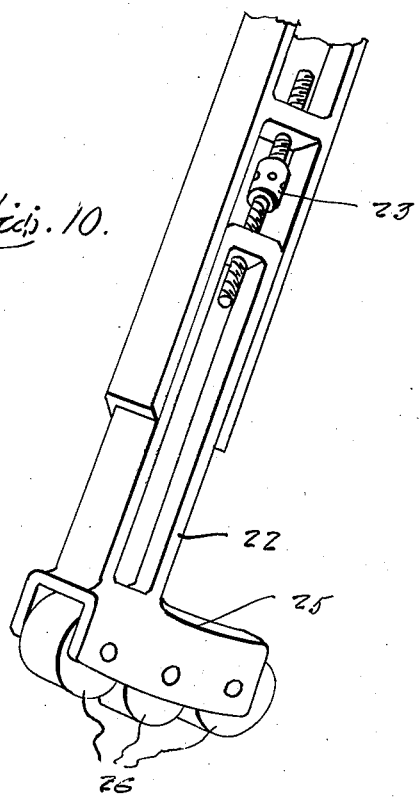
Figure 10 is a fragmentary perspective view of an arm forming part of the invention.
Figure 11:
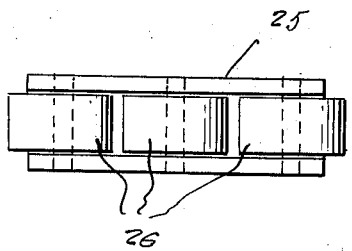
Figure 11 is an elevational view of the roller equipped end of the arm.
Figure 2:
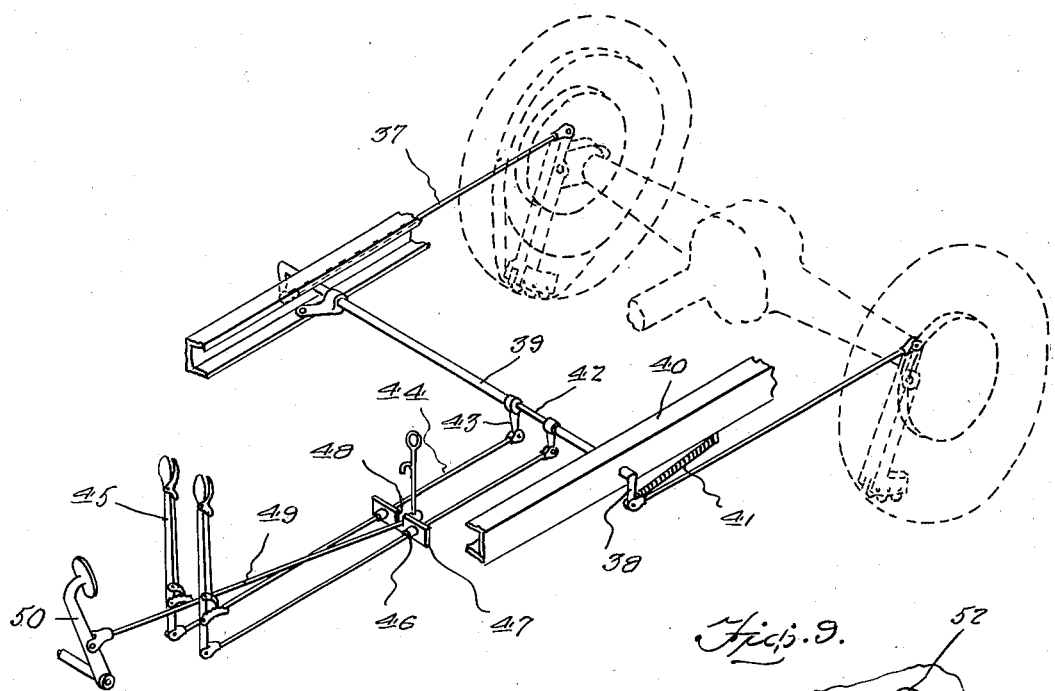
Figure 2 is a perspective view of the apparatus showing portions of the automobile.
Figure 9:
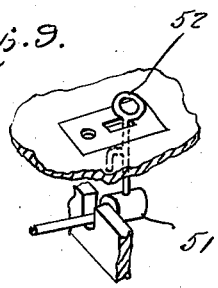
Figure 9 is a fragmentary perspective view of a catch structure.
Figure 8:
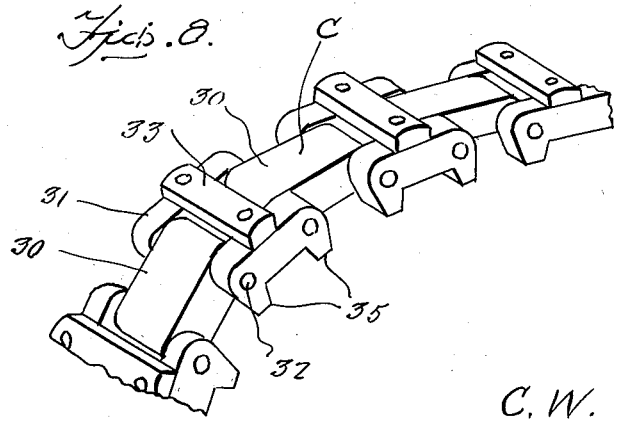
Figure 8 is a fragmentary perspective view of one of the chains.
Figure 6:
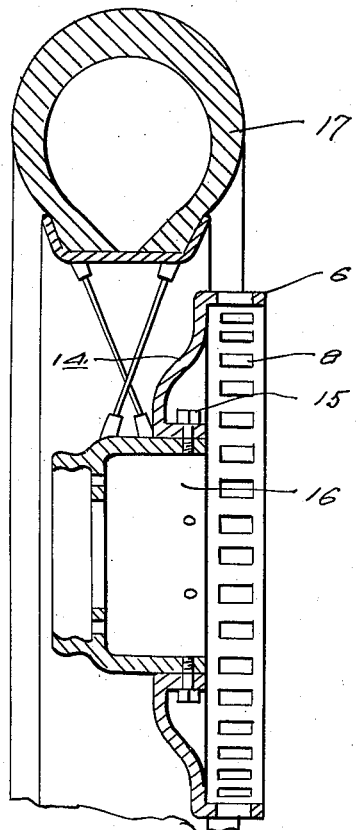
Figure 6 is a fragmentary sectional view through a wheel showing another form of sprocket.
Figure 7:
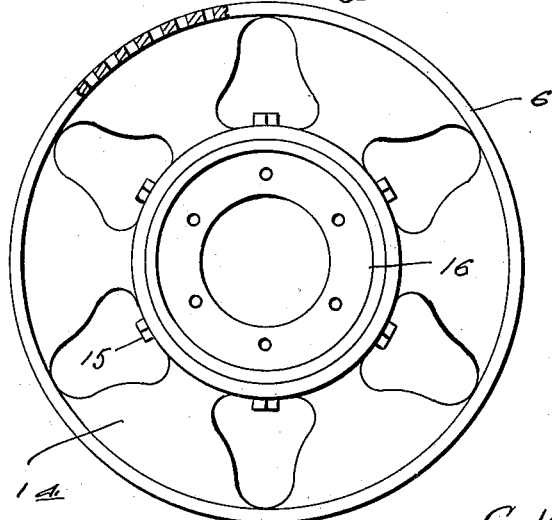
Figure 7 is a sectional elevation of the last mentioned sprocket.

Referring to the drawings in detail it will be seen that numeral 5 denotes one of a pair of rear sprockets and numerals 6 the other sprocket of said pair. The sprockets 5 and 6 are in the form of annular bands with series of openings 7 and 8 respectively. The sprocket 5 is formed at one edge with an inwardly directed annular flange 9 having apertured ears 10 projecting inwardly therefrom to be bolted as at 11 to a rear wheel 12. The sprocket 6 is formed on a plate 14 adapted to be bolted at 15 about a hub 16 of a rear wheel 17. A clamp bracket 18 is mounted on the rear axle housing 19 adjacent each wheel and has rockable thereon as at 20 an arm 21 in one end of which is adjustable an extension arm 22 by being slidable therein and adjustable by a double ended and oppositely threaded bolt 23 in a manner more clearly illustrated in Figure 10. The outer end of the arm extension 22 has a transverse channel foot 25 with a plurality of rollers 26 journalled therein. A chain C is trained about each sprocket and under the rollers 26. The chain includes a plurality of alternately arranged links 30 and a plurality of alternately arranged pairs of links 31 pivoted thereto by pins 32 and the links 31 have cross cleats 33 mounted thereon and are formed with inwardly directed cleats 35. The cleats 35 are adapted for projection in the slots or openings 7, 8 and to straddle the rollers.

Rods 37 are pivotally engaged with the upper ends of the arms 21 and are engaged with cranks 38 on the sections of a shaft 39 journalled across the frame 40 of the automobile. The spring or springs 41 tend to push the rods 37 rearwardly so as to swing the arms forwardly and upwardly in a non-engaging position. The shaft 39 is divided into two alined sections which operate independently of each other and which are hollow with a rod 42 projecting in the inner ends thereof. Cranks 43 are mounted on the inner ends of the shaft sections and have rods 44 connected thereto and leading forwardly and connected to the lower ends of hand levers 45. Stops 46 are mounted on intermediate portions of the rods 44. The rods 44 extend through a plate 47 to the rear of the stops 46 and formed with a notch 48 through which extends a rod 49 leading forwardly therefrom and engaged with the brake pedal 50. A stop 51 on the rear end of the rod 49 is adapted to engage the plate 47. This stop 51 may be lifted up by a catch 52 so as to make the foot pedal 50 inoperative if so desired.

From the above detailed description it will be readily appreciated that upon depression of the foot lever 50, the rods 37 will be caused to move forwardly so as to swing the arms 21 downwardly and rearwardly to the position shown in Figure 3 so that the chains engage the snow covered ground or the like to prevent skidding and slipping of the wheel.

Either of the chains may be actuated to operative position separately by manipulation of the proper hand lever 45 as will be quite apparent.

It is thought that the construction, operation, utility and advantages of this invention will now be quite apparent to those skilled in this art without a more detailed description.

The present embodiment of the invention has been described in considerable detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination with a pair of rear wheels of a vehicle, a frame and an axle housing, a sprocket mounted directly on each of said wheels, a pair of brackets on the axle housing, an arm pivoted on each of said brackets, rollers on one end of each arm, and each arm and the rollers thereon lying substantially in the plane of an adjacent wheel; a chain trained over each sprocket and the rollers on the end of an adjacent one of said arms, and means mounted on the frame for swinging the arms.

2. In combination with a pair of rear wheels of a vehicle, a frame and an axle housing; a sprocket mounted directly on each of said wheels, a bracket mounted on the axle housing adjacent each sprocket, an arm pivoted on each of said brackets, rollers on one end of each arm, and each arm and the rollers thereon lying substantially in the plane of an adjacent wheel; a chain trained over each sprocket and the rollers on the end of an adjacent arm, means mounted on the frame for swinging the arms, and means incorporated in each arm whereby the length thereof may be varied.

3. In combination with a vehicular traction wheel and axle housing, of a sprocket mounted directly on the wheel, a chain trained over said sprocket, and an arm having a channel part pivotally mounted on said axle housing and a second part slidably engaged with said channel part, rollers on one end of said second part engaging said chain, and means connecting said parts of said arm for shifting said second part relative to the channel part and for securing it in adjusted position.

CHARLES W. COYAN.